Patented Oct. 14, 1952

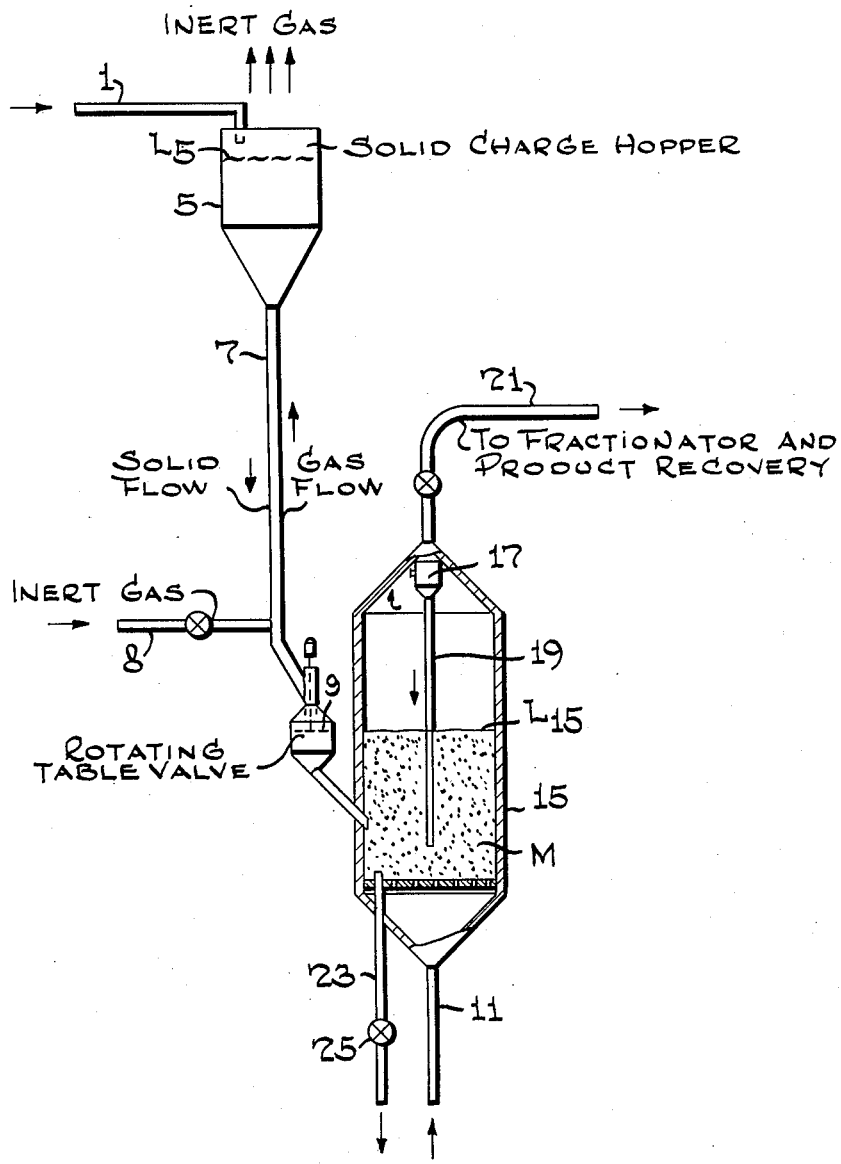

2,613,832

UNITED STATES PATENT OFFICE 2,613,832

METHOD OF FEEDING SUBDIVIDED SOLIDS

Henry J. Ogorzaly, Summit, and Walter A. Rex, Westfield, N. J., assignors to Standard Oil Development Company, a corporation of Delaware Application August 8, 1947, Serial No. 767,422

4 Claims. (Cl. 214—152)

The present invention relates to the handling of subdivided solids and, more particularly, to a method for feeding subdivided solids from a zone of relatively low pressure to a zone of relatively high pressure wherein the subdivided solid is contacted with a fluid material such as a gas or liquid.

Prior to the present invention subdivided solids have been introduced from an accumulator zone into treating zones operated at elevated pressures by using elongated legs of solids sufficiently high so that the weight per unit area of the column of solids in the leg is greater than the pressure differential between the two zones. The solids leg empties into an accumulation of subdivided solids in the treating zone so that the solids leg and the solids accumulation within the treating zone form a continuous body of solids. Solids from the leg flow into the solids mass in the treating zone at the same rate at which solids are withdrawn from said solids mass. When the solids leg is of suitable height, cross section and compactness so as to offer great resistance to gas flow, gases may be passed through the solids mass in the treating zone at an elevated pressure without escaping through the leg in appreciable amounts. Treating gas losses through the leg may be completely eliminated by maintaining a blanket of inert gas around the lower end of the solids leg at a slightly higher pressure than the pressure of the treating gas so that any gas escaping through the leg will be inert gas.

Systems of this type have utility in most cases involving the maintenance, within a treating zone, of a relatively compact moving mass of solids which serves as a seal for the solids feed leg and whose motion may be used to control the solids flow from the leg. Their most common application lies in the field of catalytic hydrocarbon conversion reactions such as catalytic cracking, polymerization, reforming, and other refining treatments of hydrocarbons in the presence of relatively compact moving catalyst beds. However, in the absence of a compact solids mass serving as a flow control means for the solids leg, this system is inoperative. Therefore, it cannot be applied to processes in which the treating zone, operated at an elevated pressure, contains the subdivided solids suspended in gases or liquids or in the form of so-called fluidized solids beds in which the subdivided solids are maintained by an upwardly flowing gas as a highly turbulent, relatively dense mass resembling a boiling liquid in appearance and hydro-static and -dynamic characteristics.

The problem of feeding finely subdivided solids to pressurized treating zones of this type has been solved in recent years by the development of the so-called aerated standpipe, which has become the most valuable tool in conveying so-called fluidized solids between zones maintained at different pressures. The aerated standpipe consists of a relatively high column of the subdivided solids maintained in the form of a readily flowing, dense, fluidized mass by the injection of small amounts of an aerating gas into one or more places distributed over its length. The fluidized solids column exerts a pseudo-hydrostatic pressure on its base as a function of the height of the column and the apparent density of the fluidized mass. The flow of fluidized solids from the standpipe is controlled by a bottom control valve and the solids may be fed from the bottom of the standpipe to any treating zone, maintained at a pressure lower than the pseudo-hydrostatic pressure of the aerated solids column on the control valve. Alternatively, the bottom control valve may be dispensed with, in which case the pseudo-hydrostatic pressure developed by the aerated solids column is equal to the differential pressure between the accumulator zone and the treating zone and the influx of solids into the treating zone, maintained with constant level, is governed by the rate of solids addition to the accumulator zone.

The smooth operation of aerated standpipes depends mainly on proper and uniform fluidization of the solids over the entire length of the aerated column, which may be accomplished as long as a pressure drop per foot of standpipe height, which is equal to the weight of solids contained per foot of standpipe height, can be maintained, without bridging of the solids column and resulting irregularity of flow. This condition may be readily complied with in the case of subdivided solids having an average particle size of less than, say, about ¼ to ½ millimeter. As the particle size increases, fluidization tends to become irregular, as a result of packing and slugging, and with large particle sizes, smooth fluidization is, in fact, impossible for long narrow columns. Consequently, with excessively large particles use cannot be made of the pseudo-hydrostatic pressure developed by the fluidizing or aeration properties of correctly sized particles for overcoming the pressure differential between zones.

These phenomena become particularly troublesome at particle sizes of above about $\frac{1}{16}$ in., such as are normally employed in the carbonization and/or gasification of carbonaceous solids such as coal, lignites, shale, etc., employing the fluid solids technique. Such coarse materials are capable of adequate fluidization in shallow and relatively wide beds, particularly since disintegration at treating temperatures often occurs. But they are not capable of smooth fluidization in columnar form at least until such disintegration has taken place. In the fluid treatment of these coarse materials, therefore, recourse is generally had to the cumbrous method of charging the solids through pressurized lock hoppers to treating zones operated at elevated pressures.

The present invention overcomes the aforementioned difficulties and affords various additional advantages as will become apparent from the following detailed description thereof.

In accordance with the present invention, coarse solids having a particle size above the ranges suitable for proper aeration in columnar form are supplied from a zone of relatively low pressure to a fluidized zone of relatively higher pressure by means of an elongated vertical column of non-fluidized solids sufficiently high to establish a gas flow resistance over its height, which at least equals the pressure differential between said low and high pressure zones. The rate of flow of solids from the bottom of the column into the high pressure fluidized zone is determined by a controlled flow restriction such as a conventional solid metering means arranged in the base of the column. An inert gas is introduced into the base of the column, above the metering device, at such a rate as to maintain, at the point of inert gas injection, a pressure at least equal to but preferably slightly higher than, that existing in the high pressure zone. This inert gas pressure is maintained as a result of the pressure drop required to force the inert gas up through the column of non-fluidized coarse solids.

It will be readily understood that with the arrangement of the invention, operation of the solids metering device permits the charging of the coarse solids into the high pressure zone at any desired rate, even if the high pressure zone contains a liquid, a dilute solids-in-gas suspension, or a fluidized solids mass. The solids flow in and from the column is merely a function of gravity combined with the effect of the metering device, and thus is not dependent on fluidization within the column. The column must be sufficiently high so that the pressure drop per unit length required to balance the differential pressure between the two zones is less than the weight of solids contained in the unit length so that lifting of the solids column will not occur. Leakage of fluid from the treating zone into the solids feed column is prevented by the back-pressure of the inert gas. This back-pressure may be even high enough to cause a flow of inert gas into the treating zone at a rate which can be readily controlled by the magnitude of the pressure differential imposed across the solids metering device. The leakage of inert gas into the high pressure zone may thus be readily kept at a negligible level. Metering devices suitable for the purposes of the invention include star feeders, slide valves, rotating tables, non-compression screws, etc.

The solids flow through and from the column is a function chiefly of the operation of the metering device while the sealing effect of the inert gas depends on the gas flow resistance of the column. The absolute weight of the solids column on its base it, therefore, of secondary importance as is the diameter of the column. Subject to the limitation previously mentioned, that the pressure drop per unit of column height must be maintained below the level of incipient slugging, the pressure and sealing effect of the inert gas may be increased practically at will by merely increasing its feed rate, without requiring an increase in column height, since losses of inert gas through the solids column are of no consequence to the operation of the process.

The necessary height of the solids column, which depends chiefly on the pressure differential between the high and low pressure zones and the apparent specific gravity and particle size of the solids within the column, may vary within wide limits. It may be stated as an example, however, that for solids having average particle sizes of about $\frac{1}{16}$ to $\frac{1}{2}$ in. and apparent bulk densities of about 40 to 100 lbs. per cu. ft. we have found that for each pound per square inch pressure differential between the high and low pressure zones, the provision of from 1 to 3 ft. of column height results in satisfactory operation. The amount of inert gas such as air or steam introduced to prevent leakage of gas from the treating zone into the solids column which we find to be satisfactory is such as to result in a superficial velocity, neglecting the volume occupied by the solid, of one to two feet per second, measured at the conditions of operation.

For example, if it is desired to feed 7,000 tons per day of an oil shale ground to pass through a $\frac{1}{4}$ in. screen and having an apparent density of about 78 pounds per cu. ft., from a feed hopper at atmospheric pressure to a distillation zone maintained at about 15 pounds per sq. in. gauge pressure, a shale column 32 ft. high and 24 in. wide, in combination with about 200 to 250 standard cu. ft. per minute of air injected into the base of the column will be sufficient for the purposes of the invention.

Having described its objects and general nature, the invention will be best understood from the following more detailed description wherein reference will be made to the accompanying drawing, the single figure of which is a schematic illustration of a system suitable to carry out a preferred embodiment of the invention.

Referring now to the drawing, the system illustrated therein essentially comprises a solids feed hopper 5, a feed standpipe 7 and a treating zone 15, the functions and cooperation of which will be presently described using the carbonization of coal as a specific example. It should be understood, however, that the system of the drawing may be applied in a generally analogous manner for other purposes involving the feed of coarse solids to a treating zone operated at an elevated pressure.

In operation, feed hopper 5 may be at atmospheric pressure and treating zone 15 maintained at any desired elevated pressure of, say, about 15 lbs. per sq. in., and a carbonization temperature of about 800°–1500° F. Treating zone 15 may contain a dense, turbulent, ebullient mass M of subdivided coal fluidized by a carbonizing gas such as superheated steam, if desired admixed with oxygen, supplied through line 11, to form a well defined upper level $L_{15}$, in a manner known per se in the art of fluid coal carbonization. The well known details of this type of fluid operation do not form a part of the present invention and need not be specifically set forth in the present specification. It is important to note, however, that the density of any fluid or solid adjacent to the inlet of solids from standpipe 7 to treating zone 15 should be insufficient to offer substantial resistance to the flow of solids from standpipe 7 into treating zone 15.

Fresh coal having an average particle size of about 16 mesh is supplied by any conventional means such as a screw conveyor, bucket elevator, or the like (not shown) through line 1 to feed hopper 5, the discharge end of which is in open connection with the upper end of feed standpipe 7. A solids metering device such as a rotating table valve [1] 9 is provided in the lower portion of standpipe 7. At the pressures indicated, the height of the coal column from level $L_5$ in hopper 5 to flow control device 9 should be about 20 to 40 ft. Under the influence of gravity, coal flows through valve 9 into treating zone 15 at a rate controlled by valve 9.

In order to prevent the escape of process gas from treating zone 15 through standpipe 7, an inert sealing gas such as air, steam, flue gas, or the like is introduced through line 3 into the base of standpipe 7 at a point above valve 9. The feed rate of the sealing gas is preferably so controlled that its pressure at its point of introduction exceeds slightly the pressure within zone 15. Thus, at the pressure conditions of the present example, the sealing gas pressure immediately above valve 9 may be about 16 lbs. per sq. in., which may be maintained by a sealing gas feed rate of about 200 to 300 standard cu. ft. per minute. When so operating, practically the total amount of sealing gas will eventually escape upwardly through standpipe 7 and feed hopper 5 to be vented from the latter. As a result of the small pressure differential between the point of inert gas injection in standpipe 7 and treating zone 15 and the restriction to gas flow represented by valve 9, only a negligible proportion of the sealing gas, say about 5%, will enter zone 15 through valve 9. The escape of gas from zone 15 into standpipe 7 is made impossible by the higher pressure above valve 9.

Returning now to zone 15, a mixture of volatile carbonization products containing suspended coal fines may be withdrawn overhead from level $L_{15}$ and passed through a conventional gas-solids separator 17. Separated coal fines may be returned to mass M through pipe 19 while volatile carbonization products now substantially free of entrained solids may be passed through line 21 to a conventional product recovery system (not shown). Spent solids, such as coke, may be withdrawn from mass M in any suitable manner, for example by way of a bottom drawoff line 23 provided with a control valve 25.

As noted above, the system of the drawing may be applied to any operations other than coal carbonization which involve the supply of coarse solids from a low pressure zone to a high pressure zone. For example, oil shale may be used in place of coal substantially as described. Zone 15 may be operated as a water gas or producer gas generating zone by raising its temperature above 1500° F. and supplying suitable amounts of a gasifying medium such as steam, $CO_2$, air, and/or oxygen through line 11. Coke may be used as a charge material in the latter case. The system of the drawing may also be used for the purpose of producing sponge iron from iron ore, concentrating valuable gases on adsorbent media, etc. in a generally analogous manner.

While the foregoing description and examplary operations have served to illustrate specific applications and results of our invention, other modifications obvious to those skilled in the art are within the scope of the invention. Only such limitations should be imposed on the invention as are indicated in the appended claims.

We claim:

1. In the method of feeding coarsely subdivided solids from a zone of relatively low pressure to a zone of relatively higher pressure wherein no substantial resistance is interposed within said zone of higher pressure against the influx of the solids, the improvement which comprises maintaining a vertical non-fluidized column of said coarse solids having a particle size between about $\frac{1}{16}$ and $\frac{1}{2}$ inch diameter within a closed path communicating with the two zones, supplying solids to an upper portion of said column at said relatively low pressure, feeding solids from the base of said column by gravity into said high pressure zone, restricting the free flow of solids in a controlled manner at a point in said base so as to control the rate of flow of said solids into said high pressure zone, introducing a gas into the base of said column at a point immediately above said point of restriction at a rate such that the pressure drop of said gas per unit length of said column in rising through said column is below the bulk density of said solids in said column, said bulk density being of the order of 40–100 lbs. per cu. ft., and controlling the height of said column within the range of about 1–3 ft. for each pound per square inch pressure differential between said low pressure and high pressure zones and the amount of said gas in such a manner that as a result of the gas flow resistance of said column said gas at its point of introduction into said base is at a pressure at least equalling said higher pressure.

2. The method of claim 1 in which the pressure of said gas at its point of introduction is sufficiently above said higher pressure to cause leakage of said gas into said high pressure zone.

3. The method of claim 1 in which said free solids flow is restricted by mechanical flow control means.

4. The method of claim 1 in which said high pressure zone contains a turbulent mass of finely divided solids fluidized by an upwardly flowing gas.

HENRY J. OGORZALY.
WALTER A. REX.

REFERENCES CITED

The following references are of record in the file of this patent:

UNITED STATES PATENTS

| Number | Name | Date |
|---|---|---|
| 1,913,968 | Winkler | June 13, 1933 |
| 2,411,996 | Kassel | Dec. 3, 1946 |
| 2,495,152 | Voorhees | Jan. 17, 1950 |

---

[1] See Pebble Heater—New Heat Transfer Unit for Industry, Chem. and Met. Eng., July 1946, pp. 116–119, particularly p. 117.